Feb. 12, 1963   E. M. GREER ETAL   3,077,102
GAUGE CALIBRATION UNIT
Filed Sept. 23, 1958

INVENTORS
EDWARD M. GREER
JOHN ROBERT SOUTHLAND
BY

ATTORNEYS 3,077,102
GAUGE CALIBRATION UNIT
Edward M. Greer, Great Neck, N.Y., and John Robert Southland, Arcadia, Calif., assignors to Greer Hydraulics, Inc., Jamaica, N.Y., a corporation of New York
Filed Sept. 23, 1958, Ser. No. 762,767
2 Claims. (Cl. 73—4)

This invention relates to the art of gauge testers and more particularly to a device for calibrating pressure gauges.

As conducive to an understanding of the invention it is noted that where a pressure gauge is calibrated by the use of a fluid such as a hydraulic liquid under pressure, contamination of the gauge under calibration may occur with possible malfunctioning thereof and possible contamination of the fluid whose pressure is being measured, which may be especially serious where, for example, the gauge is used in conjunction with liquid oxygen.

It is accordingly among the objects of the invention to provide a gauge calibration unit that has few relatively inexpensive parts that may readily be assembled, that is simple to operate and will permit highly accurate calibration of a pressure gauge without possibility of contamination thereof.

According to the invention, these objects are accomplished by the arrangement and combination of elements hereinafter described and particularly recited in the claims.

Figure 1:
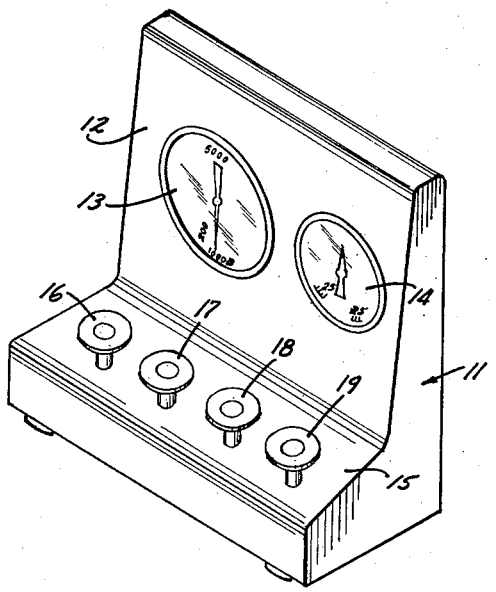
Figure 2:
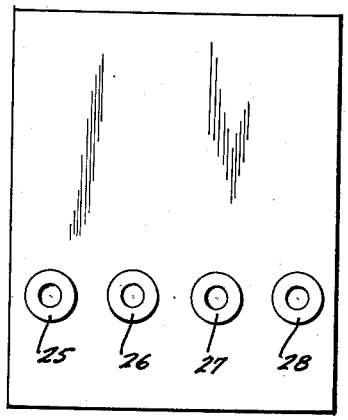
Figure 3:
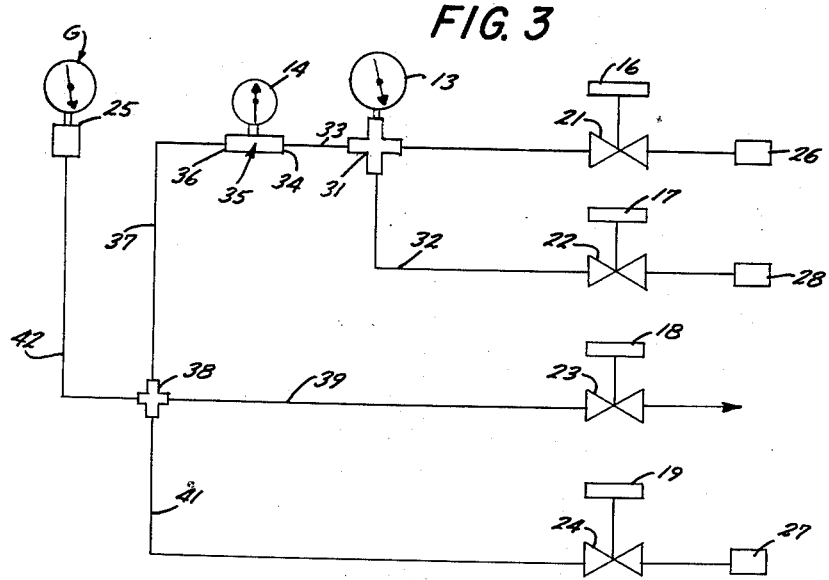

In the accompanying drawings in which are shown one or more of various possible embodiments of the several features of the invention, FIG. 1 is a perspective view of the unit,
FIG. 2 is a rear view thereof, and
FIG. 3 is a circuit diagram of the unit.

Referring now to the drawings the equipment comprises a casing 11 having an inclined front wall 12 on which is mounted a master pressure gauge 13 and a differential pressure gauge 14.

Extending at an incline from the lower edge of the front wall 12 is a control panel 15 which mounts four operating knobs 16, 17, 18 and 19 that respectively control a liquid shut-off valve 21, a liquid bleed valve 22, a gas bleed valve 23 and a gas shut-off valve 24, all of said valves being mounted in casing 11.

The rear of the casing has four fittings, 25, 26, 27 and 28 in operation of the unit, the gauge under test being connected to fitting 25, the source of liquid under pressure to fitting 26, the source of gas under pressure to fitting 27, and a return line for liquid being connected to fitting 28.

The various components are connected as shown in the hydraulic circuit of FIG. 3. Thus the liquid inlet fitting 26 is connected through liquid shut-off valve 21 to a junction 31 to which the master pressure gauge 13 is connected. The junction 31 is connected through line 32 and liquid bleed valve 22 to liquid return fitting 28. In addition the junction 31 is connected by line 33 to one of the pressure inlets 34 of a differential pressure unit 35 to which the differential pressure gauge 14 is also connected. The other pressure inlet 36 of the differential pressure unit 35 is connected by line 37 to a junction 38 which is connected through line 39 and gas bleed valve 23 to atmosphere. The junction 38 is also connected through line 41 and gas shut-off valve 24 to the gas inlet fitting 27 and through line 42 to gauge connector fitting 25. The unit 35 is of the type in which the fluids applied to the inlets 34 and 36 are completely isolated from each other.

In the operation of the unit the pressure gauge G to be tested is connected to fitting 25. Assuming that the gauge G is to be calibrated in increments of 1,000 p.s.i. from 1,000 to 10,000 p.s.i., with the liquid bleed valve 22 and the gas gleed valve 23 in closed position, liquid and gas under pressure of say 1,000 p.s.i. are applied to the liquid inlet fitting 26 and gas inlet fitting 27. Such liquid and gas will flow respectively through the open valve 21 and junction 31 and through the open valve 24 and junction 38, into the pressure inlets 34 and 36 of the differential pressure unit 35.

The liquid pressure will be indicated on the master pressure gauge 13, which is of extreme accuracy in the order of ±⅕₀ of 1%, and such pressure is maintained at 1000 p.s.i. in the illustrative example herein described, which is the first calibration point. Since both the liquid and gas under pressure are applied to the differential pressure unit 35, if there should be any difference between the pressures, the differential pressure gauge, which also is of extreme accuracy will indicate the difference.

The gas pressure is adjusted until the needle of the differential pressure gauge 14 is at zero, which would mean that the gas pressure also has a value of 1,000 p.s.i.

Since the gauge under test is also connected to the gas pressure source, if the gauge is accurate, it will also show a reading of 1,000 p.s.i.

If the gauge under test is not accurate, it will show some other value. Assuming that this value is say, 980 p.s.i., to calibrate the gauge, the gas pressure is increased above 1,000 p.s.i. until the gauge under test indicates 1,000 p.s.i. Such additional pressure, which is applied also to the inlet 36 of the differential pressure unit 35, will be greater than the pressure applied to inlet 34 of the unit 35. Hence the needle of the differential pressure gauge will deflect an amount equal to the added gas pressure required to correct the inaccuracy of the gauge under test. Since the differential pressure gauge is extremely accurate it may show a reading of say, 22 p.s.i., rather than 20 p.s.i., apparently required to cause the gauge under test to deflect to 1000 p.s.i.

Consequently, the calibration curve for the gauge under test at 1000 p.s.i. will show the actual pressure to be 1022 p.s.i. This procedure is repeated throughout the entire range of operation of the gauge under test, so that when the latter is in use the indication thereon may be checked against such calibration curve to provide an accurate indication of the pressure that is being measured.

After the calibration has been completed, the unit is reset by closing liquid and gas inlet valves 21 and 24 and opening liquid and gas bleed valves 22 and 23.

Since the value of the liquid pressure initially applied is read on the master gauge 13, which is of extreme precision, an accurate standard is provided for subsequent measurement, and since the differential pressure gauge is also of correspondingly extreme precision, the error readout on this gauge will be extremely accurate. Thus the differential reading feature permits read-out to any desired accuracy and the overall accuracy is limited only by the accuracy of the master gauge.

The differential pressure gauge desirably is of the type having built in temperature compensation and cannot be damaged by over-pressurization on either side.

As the gas side of the circuit to which the gauge G under the test is connected is completely isolated from the liquid side, by reason of the differential unit 35, the gauge G after it has been cleaned may be calibrated without any risk of contamination. The unit is thus especially suitable for use in testing of gauges that have been cleaned for liquid oxygen services in which contamination can be extremely serious.

As many changes could be made in the above equipment and circuit, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A gauge calibration unit comprising a differential pressure unit having a gas pressure inlet and a liquid pressure inlet, the gas and liquid side of said differential pressure unit being completely isolated from each other, and having an associated pressure gauge to indicate the differential between the pressure applied to said inlets, means to connect a source of liquid under pressure to the liquid inlet of said differential pressure unit, a master pressure gauge connected to said last named inlet to indicate the pressure on the liquid from such source, means to connect a source of gas under pressure to the gas inlet of said differential pressure unit and means to connect the gauge to be calibrated to said gas inlet of said differential pressure unit.

2. The combination set forth in claim 2 in which a shut-off valve is provided between the master pressure gauge and such liquid source, a bleeder valve is provided having an inlet connected to the liquid inlet of the differential pressure unit, a shut-off valve is provided between said gas inlet and the gas source and a bleeder valve is provided having an inlet connected to said gas inlet of the differential pressure unit.

References Cited in the file of this patent

UNITED STATES PATENTS

| | | |
|---|---|---|
| 2,310,974 | Lumm | Feb. 16, 1943 |
| 2,719,431 | Grant | Oct. 4, 1955 |
| 2,816,444 | Gomez | Dec. 17, 1957 |
| 2,866,365 | Worthen | Dec. 30, 1958 |

FOREIGN PATENTS

| | | |
|---|---|---|
| 713,657 | Great Britain | Aug. 18, 1954 |

OTHER REFERENCES

Publication: "A Course for Ground Engineers," by R. W. Sloley Aircraft Engineering, April 1930 pages 92–96 (only pages 93 and 94 are required).